INVENTOR.
ROBERT S. WILLIS
BY Paul A. Weilein
ATTORNEY

June 28, 1966 R. S. WILLIS 3,258,027
REMOTELY CONTROLLABLE AUTOMATIC SHUT-OFF VALVE
Filed April 10, 1961 4 Sheets-Sheet 3

INVENTOR.
ROBERT S. WILLIS
BY
Paul A. Weilein
ATTORNEY

June 28, 1966  R. S. WILLIS  3,258,027
REMOTELY CONTROLLABLE AUTOMATIC SHUT-OFF VALVE
Filed April 10, 1961  4 Sheets-Sheet 4

INVENTOR.
ROBERT S. WILLIS
BY
Paul A. Weilein
ATTORNEY 3,258,027
REMOTELY CONTROLLABLE AUTOMATIC
SHUT-OFF VALVE
Robert S. Willis, 4341 Olive, Long Beach, Calif.;
N. Elizabeth Willis, executrix of said Robert S. Willis,
deceased
Filed Apr. 10, 1961, Ser. No. 101,966
9 Claims. (Cl. 137—458)

The present invention relates to shut-off valves, and more particularly to a shut-off valve which is adapted for, but not limited to, use as a shut-off valve at a well head, as for example, where oil and/or gas wells are flowing under pressure.

In my co-pending patent application, Serial No. 854,940, filed November 23, 1959 (now Patent No. 3,092,136, issued June 4, 1963) there is disclosed a fluid pressure operated shut-off valve which is particularly well suited for controlling the flow of oil and gas wells wherein high pressures on the order of several thousand pounds per square inch are encountered. In that co-pending application the shut-off valve includes a fluid pressure operated main valve piston which is normally held open by the pressure of fluid in the flow line, but which includes a high pressure pilot valve as well as a low pressure pilot valve, whereby upon an abnormal variation in flow line pressure either above or below a value for which the shut-off valve is preset, fluid pressure derived from the flow line is employed to close the main valve and thus shut the well in to prevent further flow. The valve of that pending application incorporates a manual bleeder valve and a manual reset valve to enable the subsequent reestablishment of the control function of the valve when the abnormal condition has been corrected.

It is an object of the present invention to provide a fluid pressure operated shut-off valve of the general type disclosed in my above identified co-pending application, but wherein the main valve, while being normally held open by line pressure, is adapted to be closed responsive to either (1) an abnormal rise in line pressure, (2) an abnormal drop in line pressure, (3) manually from a remote location independent of line pressure.

In accomplishing the foregoing objective, the present invention contemplates a first pilot valve means for controlling the main valve, this pilot valve means being responsive to either of the aforementioned circumstances, that is, either a rise in pressure, a drop in pressure or a manual act.

In addition, it is an object of the invention to provide in conjunction with the pilot valve controlled main valve, a remotely controllable second pilot valve means whereby to enable the main valve to be reset.

Another object of the invention is to provide a hydro-electrically controlled, pressure responsive shut-off valve including an electrically operated pilot valve for modifying the pressure conditions applicable to the main valve, responsive to either a rise or drop in pressure.

Yet another object is to provide an electrically controlled fluid pressure operated shut-off valve according to the next preceding object wherein the electrically operated pilot valve means is adapted to be remotely controlled so as to effect closure of the main shut-off valve or opening of the main shut-off valve from a remote location.

More specifically, it is an object of the invention to provide a fluid pressure operated shut-off valve for a flow conduit wherein the pressure of fluid in the conduit normally holds the shut-off valve in an open position, but wherein means are provided for employing fluid pressure derived from the flow line for closing the shut-off valve and subsequently reopening the shut-off valve. In accomplishing this objective, the main shut-off valve is disposed in a chamber and is so constructed that it has a minor area exposed to fluid pressure in the conduit and a major area exposed to fluid pressure in the chamber. A first pilot valve means is provided for controlling the flow of line fluid to the valve chamber, and this pilot valve means would normally be closed. A second pilot valve means is employed for venting or bleeding the valve chamber to atmosphere when it is desired to reset the main valve following closure thereof. Each of the pilot valve means is preferably fluid pressure actuated by means of a motor-pump actuator mechanism, each of which is respectively under the control of a power circuit and a related control circuit so that the first pilot valve means will be operated to establish communication between the conduit and the valve chamber, thereby to expose the major area of the valve to line pressure and thereby close the valve, responsive to an abnormal rise in line pressure or an abnormal drop in line pressure or responsive to the closure of a remotely located switch in the control circuit. The second motor-pump pilot valve means is also operable by a remotely located switch in the control circuit to vent the valve chamber to atmosphere following correction of the need for shutting off the flow through the conduit.

Other objects and advantages of the invention will be hereinafter described or will become apparent to those skilled in the art and the novel features of the invention will be defined in the appended claims.

In the accompanying drawings.

Like reference characters in the several views of the drawings and in the following description designate corresponding parts.

The shut-off valve assembly of the invention is adapted to be installed in a fluid flow line as, for example, in a Christmas tree as illustrated in my above identified pending patent application, so that in the event of a ruptured flow line leading from the Christmas tree or if for any other reason pressure at a selected point should drop, or in the event that pressure should rise abnormally, the flow of fluid will be shut off, thus preventing loss of fluid or blow out of a well, or other objectionable consequence of continued flow.

Figure 1:
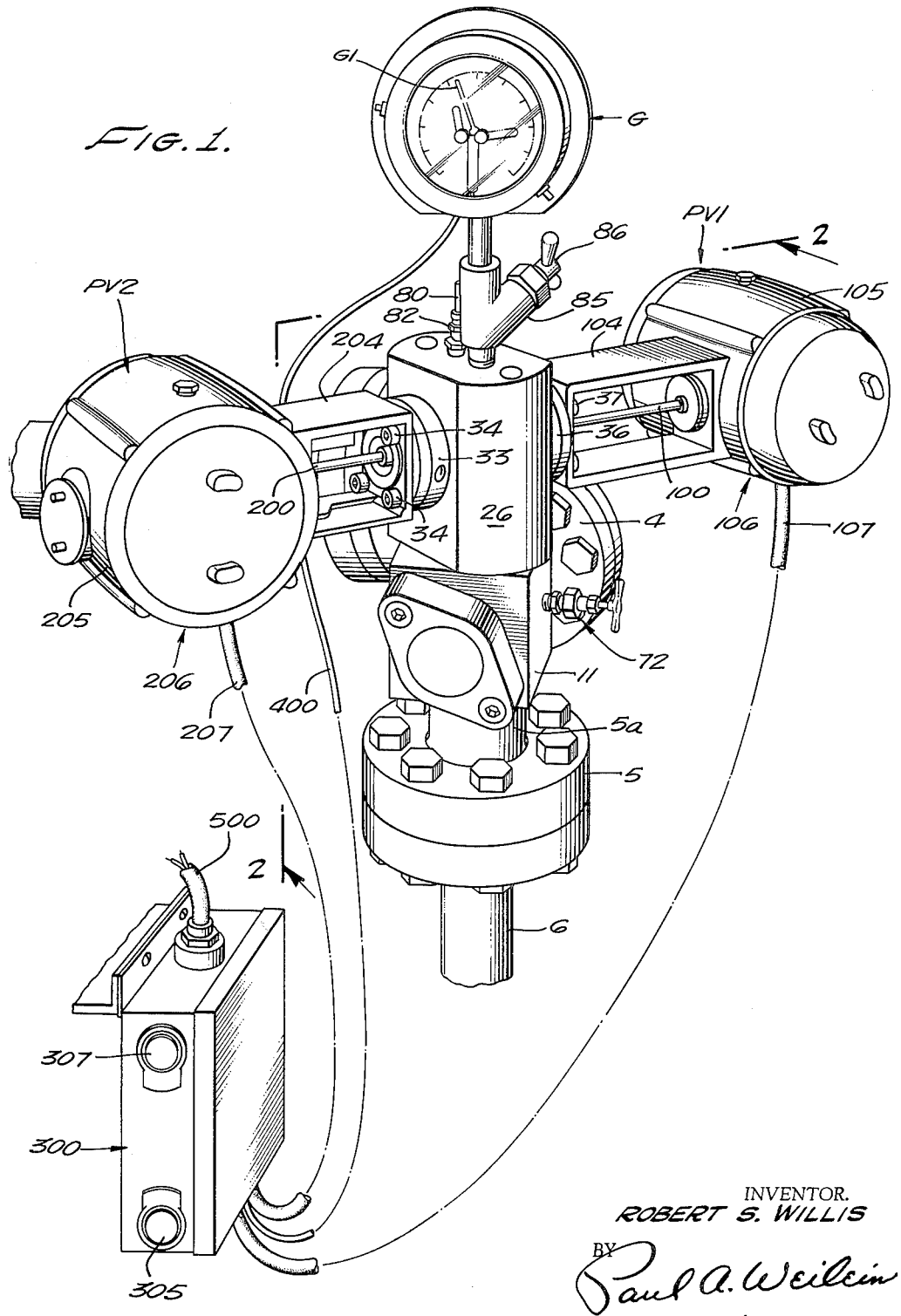
FIG. 1 is a perspective view of a shut-off valve assembly made in accordance with the invention.

Referring to FIG. 1, the shut-off valve assemblage is herein illustrated as having a supporting flange 4 adapted to be connected to a flanged coupling of a flow line at the inlet side of the valve. The valve assembly also includes a flange 5 adapted to be connected to a discharge line 6.

Figure 2:
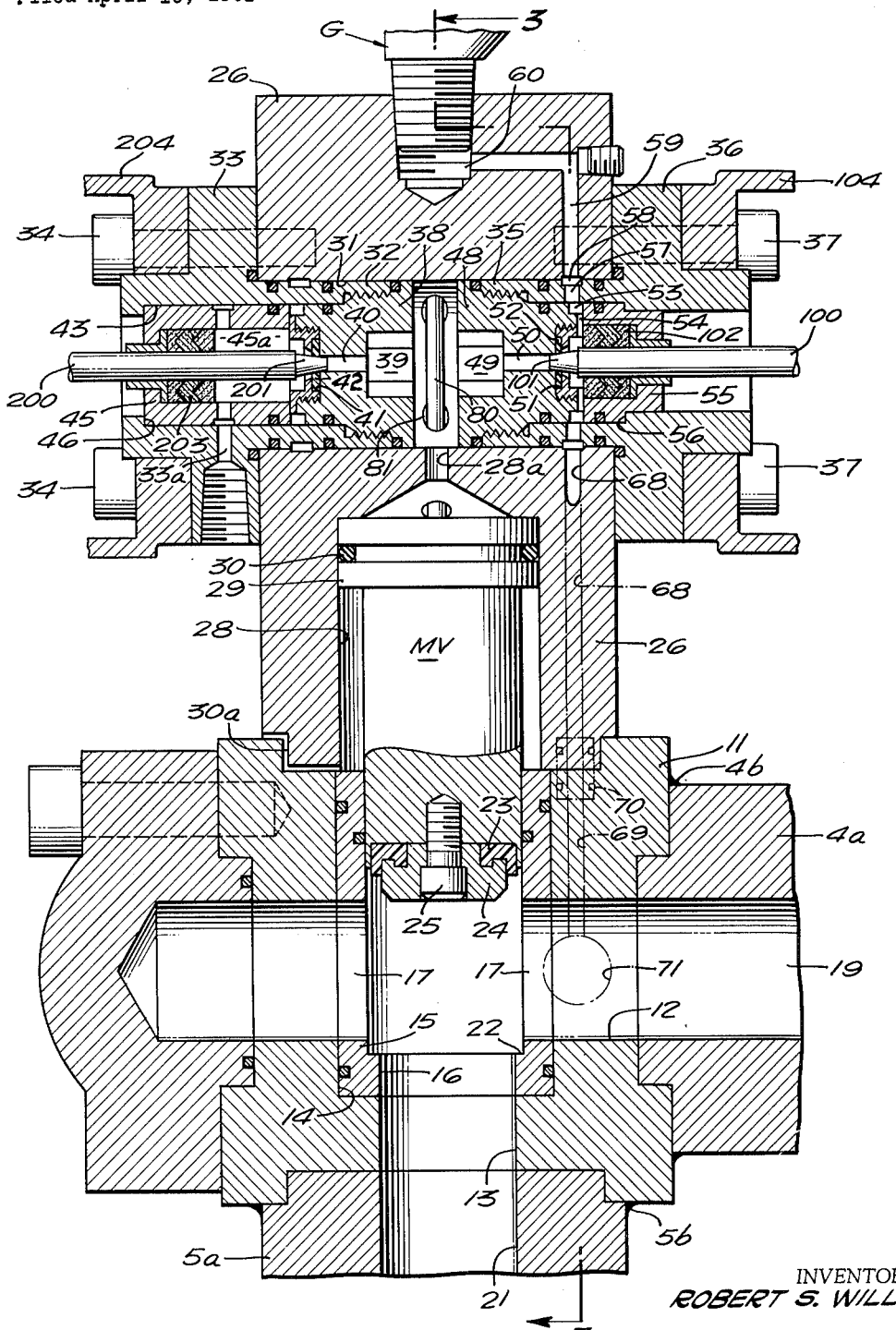
FIG. 2 is a fragmentary vertical sectional view as taken substantially on the line 2—2 through the assemblage of FIG. 1.
Figure 4:
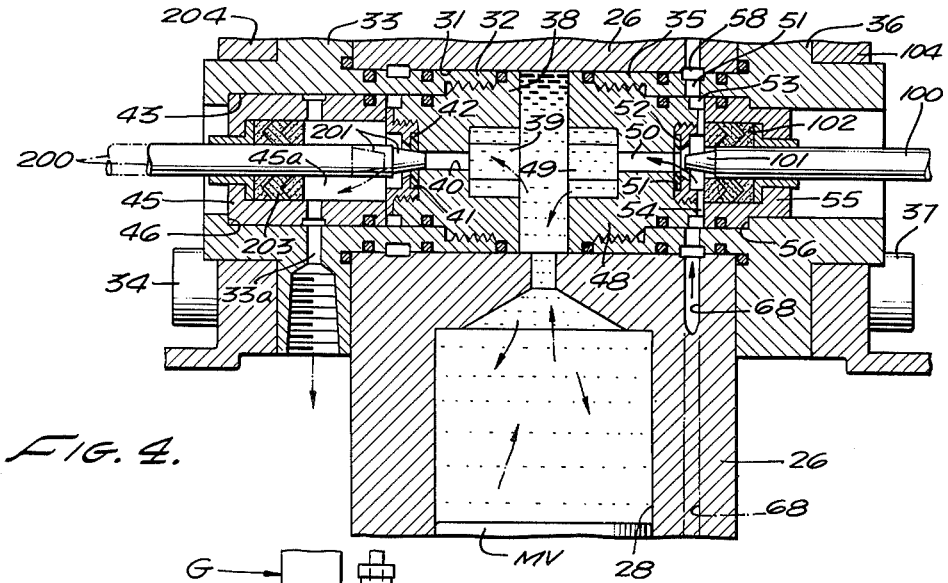
FIG. 4 is a fragmentary sectional view illustrating the pilot valve means in their respective control positions relative to the normally closed positions of FIG. 2.

Upon reference to FIG. 2, it will be noted that the valve assembly generally comprises a central support block 11 which is cross bored as at 12 and 13 and counterbored in alignment with the bore 13 as at 14. Disposed in the counterbore 14 is a liner sleeve 15 having a pair of diametrically opposed ports 17, 17 aligned with the bore 12. An inlet neck 4a is welded as at 4b or otherwise suitably connected to the central block 11 and the neck 4a has an inlet passage 19 communicating with the bore 12 in the block 11. A discharge neck 5a is welded as at 5b or otherwise suitably connected to the central block 11 and is provided with an outlet passage 21 which communicates with the passage 13 in central block 11 and thence with the bore 12 through an end port 16 at the base of the liner 15.

The liner 15 is provided with an annular shoulder 22 at its lower end constituting a valve seat engageable by the lower end of a main valve MV. This main valve MV is in the form of a differential end area piston and is shiftably disposed in the liner 15 for longitudinal movement. At its lower extremity the main valve MV has a resilient valve head 23 secured thereto as by means of a retainer cap 24 and cap screw 25. Preferably the valve head 23 is composed of Teflon or the like material having good resistance to the deleterious effects of petroleum fluids, particularly in those instances where the valve is employed as a control valve for flowing oil and gas wells.

It will be noted that the main valve MV projects from the sleeve 15 into a tubular body 26 which is suitably secured to the central block 11 as by a number of screws 27 (see FIG. 3) extending through the body 26 and into the central block 11. Within the body 26 is a cylinder 28 in which is slidably disposed an annular piston 29 provided at the upper end of the main valve MV, the piston 29 being sealed to the cylinder wall as by an O-ring or other piston ring 30. The cylinder space lying between the piston 29 and the base of the sleeve 15 is vented to atmosphere as by a passage 30a formed between the central block 11 and the body 26 so as to prevent the entrapment of fluid between the piston 29 and the sleeve 15 as would interfere with free motion of the main valve MV in a downward direction. The space in the cylinder 28 above the piston 29, it will now be recognized, constitutes a valve chamber in which the major area of the main valve is exposed to such fluid pressure as may obtain in the chamber, while the lower end of the main valve provides a minor area exposed to pressure in the line leading from inlet passage 19 to outlet passage 21. Accordingly, a pressure acting on the major end area of the main valve equal to or substantially less than line pressure, will shift the main valve to its seat 22. In accordance with a feature of the invention, well pressure is employed to effect such movement of the valve under certain controlled conditions, as will be hereinafter more particularly pointed out.

Above the main valve chamber the body 26 is provided with a cross bore 31. Extending into the bore 31 at the left hand end of the latter as viewed in FIG. 2, is a cylindrical neck 32 of a reset pilot valve support fitting 33 which is secured to the body 26 as by a suitable number of cap screws 34; extending into the bore 31 at the other end thereof, is a cylindrical neck 35 of a high and low pressure or control pilot valve support fitting 36 which is secured to the body 26 as by means of cap screws 37.

Threaded into the neck 32 of the reset pilot valve support fitting 33 is a member 38 having at its inner end a hexagonal or other appropriate opening 39 for reception of a tool, there being a passage 40 extending through the member 38 into the opening 39. Threaded in the outer end of the member 38 is a pilot valve seat 41 preferably having a Teflon or other suitable sealing element 42. The reset pilot valve support fitting 33 has disposed in a bore 43 therein a reset pilot valve stem support 45 which shoulders as at 46 in the bore in fitting 33.

Correspondingly, there is a member 48 threaded into the neck 35 of the control pilot valve support fitting 36, this member 48 also being provided with a tool receiving opening 49 in its inner end communicating with a passage 50 extending through the member 48. At its outer end the member 48 is provided with a pilot valve seat 51 also preferably having a Teflon seat 52.

The member 48 provides an annular channel 53 at its outer extremity and has radial passages 54 leading to the annulus 53. A cylindrical control pilot valve stem support 55 shoulders as at 56 in a bore in the fitting 36 and is held in place by engagement with the inner end of the member 48. The control pilot valve support fitting 36 has radial passages 57 leading to an annular space 58 formed between the fitting 36 and the body 26. Leading from the annulus 58 is a passage 59 in the body 26 which communicates with an outlet 60, the latter being bored and tapped for the reception of a pressure gauge generally denoted at G (see FIG. 1, particularly). The body 26 is provided with a further passageway 68 leading from the annulus 58 to a passage 69 in the central block 26 through a fitting 70 disposed at the interface between the body 26 and the central block 11.

Figure 3:
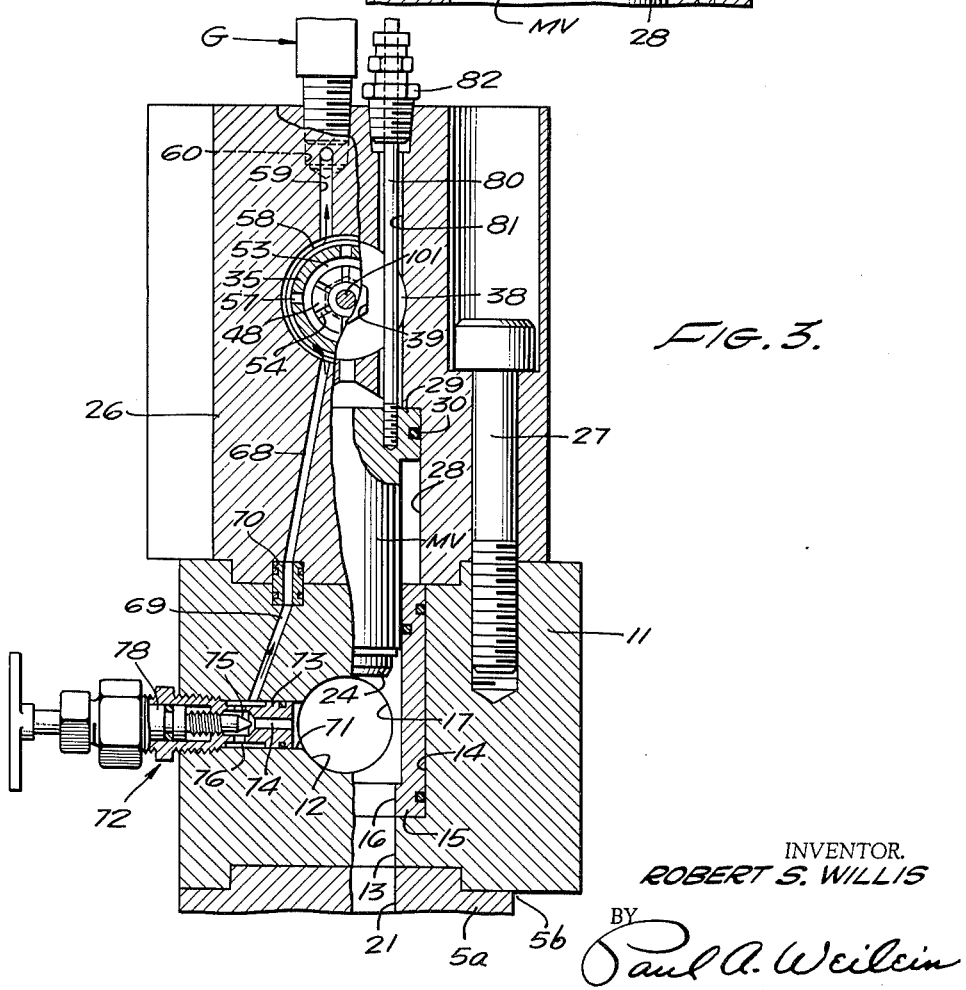
FIG. 3 is a vertical sectional view on a reduced scale as taken substantially on the line 3—3 of FIG. 2 but with certain of the parts partially broken away.

The passageway 69, as best seen in FIG. 3, communicates with a laterally extended bore 71 in the central block 11. In this bore 71 is disposed a manually operable valve assembly 72 including a body 73 having a port 74 leading to a chamber 75 which is in communication with an annulus 76 from which the passageway 69 in the block 11 leads. A conventional screw type valve stem 78 is carried by the valve body 73 so as to open or close the port 74, thus enabling flow from the bore 12 in block 11 through passage 69, fitting 70, passage 68, annulus 58, radial passages 57, annulus 53 and radial passages 54 to the pressure gauge G when the valve 72 is open.

Under normal operating conditions the flow of fluid from the inlet of the shut-off valve to the main valve chamber previously referred to, is prevented by a high and low pressure pilot valve means generally designated PV1. In this connection it will be recognized that the first pilot valve means PV1, as seen in FIG. 2, includes a pilot valve stem 100, the inner extremity of which is preferably tapered as at 101 and normally engaged with the pilot valve seat 52 carried by member 48. Likewise, in the illustrative embodiment a pilot valve stem 200 of a second or bleeder pilot valve means PV2 has a tapered inner extremity 201 normally engaged with the pilot valve seat 42 carried by member 38. High and low pressure pilot valve stem 100 is sealingly engaged in the pilot valve stem support 55 as by means of appropriate packings 102, while pilot valve stem 200 of the second pilot valve means PV2 is sealingly engaged in pilot valve stem support 45 as by means of appropriate packings 203.

In the embodiment of the invention specifically illustrated, the pilot valve stems 100 and 200 are shown in a closed position in FIG. 2 which may be a normal position. However, it will be recognized as the description progresses that at least pilot valve stem 200 may normally be off at its seat and normally open but closed only when the high and low pressure pilot valve stem 100 is shifted away from its seat.

The high and low pressure pilot valve means PV1 includes a mounting bracket 104 suitably attached to or mounted upon the high and low pressure pilot valve support 36 as by the cap screws 37 previously described, and as will be observed in FIG. 1, the pilot valve stem 100 extends through the box-like bracket 104. At the outer extremity of the bracket 104 is a housing 105 of a motor-pump combination generally designated 106 which will hereinafter be more particularly described. For the present description, however, is is sufficient to note that the motor-pump combination 106 is effective to cause longitudinal movement of the pilot valve stem 100 toward and away from its seat 52. Similarly, the reset pilot valve means PV2 is supported on a bracket 204 which is secured to the reset pilot valve means support 33 as by cap screws 34 previously referred to and the reset pilot valve stem 201 extends through the supporting bracket 204 from a motor-pump combination having a housing 205 and generally denoted at 206. It will be noted that a conductor cable 107 leads from motor-pump assembly 106 to a control box generally designated 300 and likewise a conductor cable 207 leads from the motor-pump combination 206 to the control box 300.

Also leading from the control box 300 is a conductor cable 400 which is connected to the pressure gauge G, and a conductor cable 500 leads into the box 300 to provide a source of electric power.

Figure 5:
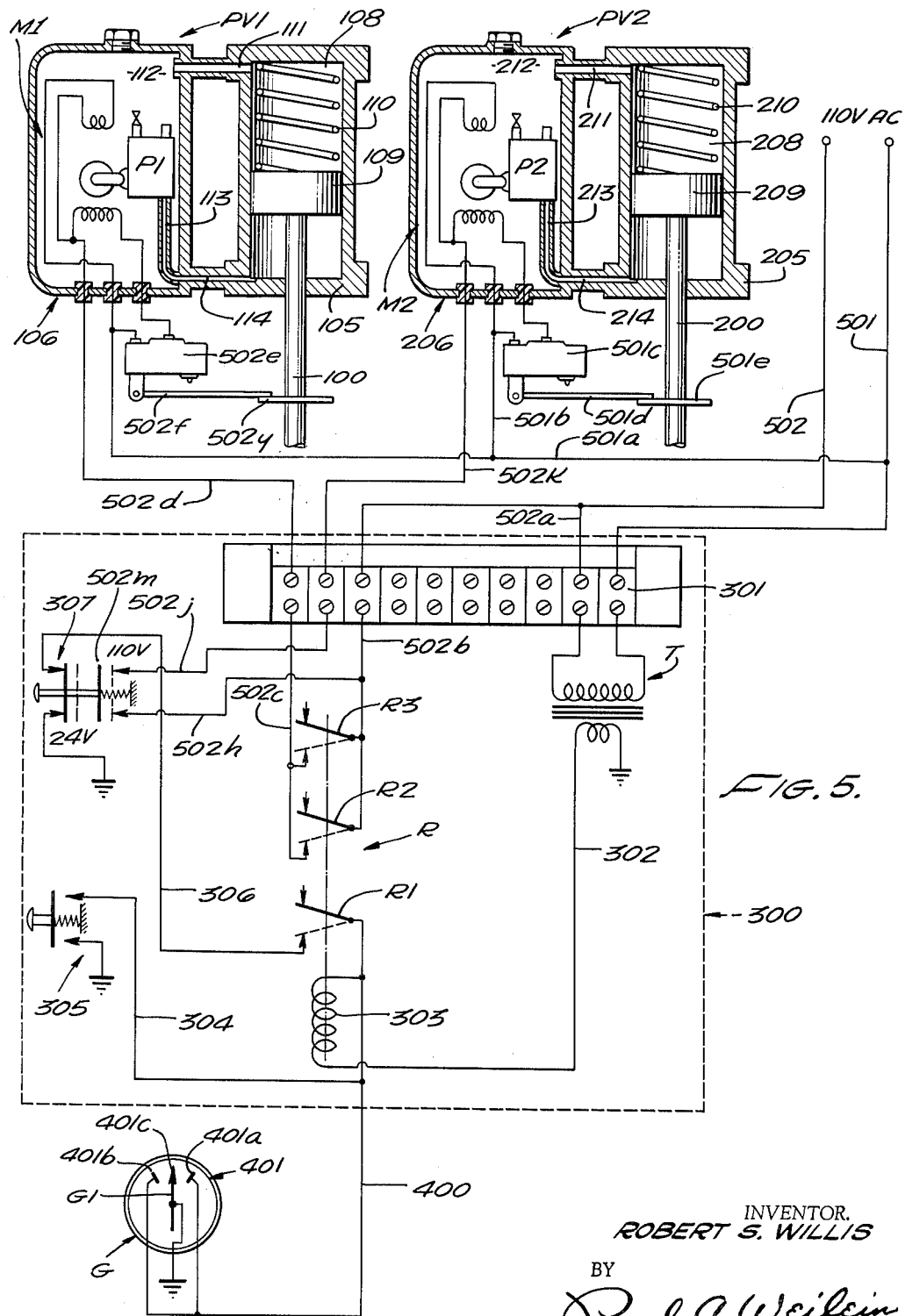
FIG. 5 is a diagrammatic illustration of the control and operating circuitry for the pilot valve means.

Referring now to FIG. 5, it will be noted that the pilot valve stem 100 of the first pilot valve means PV1 extends from one end of a power cylinder 108 in which is reciprocably disposed a pilot valve stem actuator piston 109. This piston is spring loaded by a spring 110 so as to normally urge the pilot valve stem 100 into engagement with its seat 52. The cylinder 108 communicates through a port 111 with a reservoir 112 containing hydraulic fluid. Within the reservoir is a pump P1 adapted to be driven by an electric motor designated M1 when this motor is energized so as to supply hydraulic fluid from the reservoir 112 through a pump discharge conduit 113 and a port 114 into the cylinder 108 beneath the pilot valve actuator piston 109 as shown in FIG. 5.

Similarly, it will be observed that the reset pilot valve means PV2 includes a cylinder 208 in which is reciprocably disposed a pilot valve actuator piston 209, the pilot valve stem 200 extending from the cylinder 208 and being actuatable by the piston 209 under the influence of a spring 210 so as to normally assume a position as shown in FIG. 2 in engagement with the pilot valve seat 42. The cylinder 208 communicates through a port 211 with a reservoir 212 in which is disposed a pump P2 adapted to be driven by an electric motor M2 which when energized will cause the pump P2 to supply hydraulic fluid under pressure through a discharge line 213 and a port 214 to the cylinder 208 beneath the pilot valve stem actuator piston 209, as shown in FIG. 5.

The motor-pump combinations 106 and 206 described above are connected to a source of electric power by means of a pair of leads 501 and 502 within the supply conductor cable 500 previously referred to. Lead 501 is connected to a connector bar 301 within the control box 300 to a transformer T. Lead 502, through a branch 502a, is also connected to the transformer T. The transformer T has an outlet line 302 leading to a coil 303 of a three pole double throw relay designated R. The coil 303 of relay R is connected to a high and low pressure switch designated 401 which is incorporated within the pressure gauge G previously referred to. In addition, the relay coil 303 is in circuit through a line 304 with a manually operable switch designated 305.

The high and low pressure switch 401 has a pair of contacts 401a and 401b as well as a contact 401c, the latter being movable with the pointer G1 of pressure gauge G so as to engage the contact 401a upon a predetermined rise in pressure and so as to engage the contact 401b upon a predetermined drop in pressure, depending upon the setting of the pressure operated switch mechanism, as is well known in such devices. It will accordingly be observed that upon manual closure of switch 305 or upon pressure responsive closure of switch 401, the relay coil 303 will be energized to shift the contact arms R1, R2 and R3 of the relay R from the positions shown in full lines to the respective positions shown in broken lines in FIG. 5. In this event, it will now be observed that through the contact R1 of relay R, the line 302 from the transformer T is now connected to a line 306 leading to a normally closed switch 307 which is in circuit with the relay coil 303 when relay contact arm R1 is in the broken line position, so that the relay R will be held with the coil 303 energized.

Supply lead 502 is connected through the bar 301 and through a line 502b with each of the contacts R2 and R3 of the relay R. The contact arms R2 and R3, accordingly when in the broken line positions of FIG. 5, supply current to a line 502c leading through the connector bar 301 to a line 502d which is in circuit with the coil windings of motor M1 of motor-pump combination 106, a line 501a completing the circuit between the source of power and the motor coils. It will be noted, however, that a limit switch 502e controls the motor M1 and is actuatable by an actuator arm 502f engageable by an abutment 502y on pilot valve stem 100 for the purpose of opening the switch 502e and breaking the supply circuit to the motor M1 when the pilot valve stem 100 is retracted from its seat.

A line 502h leading from line 502b is adapted to be connected to a line 502j by means of a switch 502m operable conjointly with opening of the normally closed switch 307. Line 502j leads from the switch 307a through the connector bar 301 to a line 502k which is connected with the coils of motor M2 of motor-pump combination 206, the motor coils of motor M2 being connected to line 501a and, therefore, to line 501 by a branch line 501b. Energization of the motor coils of motor M2 will cause pump P2 to supply fluid through conduit 213 and passage 214 to the cylinder 208 so as to urge the piston 209 upwardly as seen in FIG. 5. Energization of motor M2 will be interrupted by a limit switch 501c having a control arm 501d engageable by an abutment 501e carried by a pilot valve stem 200 of the second pilot valve means.

From the foregoing, it will be apparent that the first pilot valve means PV1 and the second pilot valve means PV2 are under the control of the low voltage control circuit which derives its source of power from the transformer T and is controlled by switches 305, 307 and 401. The control circuit determines whether the motors M1 and M2 of pilot valve means PV1 and pilot valve means PV2 are energized or deenergized, the motors M1 and M2 being energized by a high voltage current as, for example, an ordinary 110 volt supply, while the control circuit may be a low voltage circuit on the order of 24 volts.

With both the control circuit and the power circuit in the condition shown in FIG. 5, there is no consumption of power since both circuits are open. However, upon engagement of contact arm 401c of the high and low pressure switch 401 with either of switch contacts 401a or 401b responsive to an abnormal change in pressure at gauge G, relay coil 303 will be energized, closing the circuit leading to the motor M1 of the first pilot valve means PV1 so as to shift the pilot valve stem 100 away from its seat. Thereupon, fluid under pressure entering the bore 12 of the central block 11 of the valve assembly will pass through manual valve 72, previously described, and thence via the passageways leading through the housing 26 and into the zone at the outer end of the fitting 48 of pilot valve seat 52. Such fluid passes through passageway 50 into the space lying between fittings 38 and 48 and thence through an opening 28a in the upper end of the body 26 into the main valve chamber. As previously described, the major area of the main valve is exposed to pressure within the valve chamber; thus, with the pilot valve stem 100 off its seat, pressure in the main valve chamber will be substantially at line pressure, though actually slightly reduced due to the pressure drop through the tortuous path leading to the main valve chamber from the bore 12 of the valve central block 11. However, even at this reduced pressure, with the major area exposed to such pressure, the main valve will be shifted downwardly from the position shown in FIG. 2 so as to bring the valve head 23 into engagement with the seat 22, thus blocking off the flow of fluid through the valve.

Following closure of the main valve MV, the motor M1 of the first pilot valve means PV1 will be deenergized by the limit switch 502e and spring 108 will urge the pilot valve actuator piston 109 downwardly as seen in FIG. 5 and hence will shift pilot valve stem 100 back to its seat. The main valve will remain closed, however, since line pressure is now trapped within the main valve chamber and the minor area of the main valve is now at a significantly reduced pressure due to the shut off of flow through the valve assembly. The valve will remain closed until it is reopened responsive to shifting of the switch 307 and the switch 502m from the full line positions shown in FIG. 5 to the broken line positions of FIG. 5, whereby switch 307 will interrupt the circuit leading to motor M1 of the first pilot valve means PV1 and switch 502m will close the circuit to the motor M2 of the second pilot valve means PV2.

It will be noted at this juncture that opening of switch 307 also breaks the circuit which is holding the relay R with the contact arms R1, R2 and R3 in the broken line positions of FIG. 5, and the coil 303 of relay R will be deenergized so that the contact arms R1, R2 and R3 thereof will return to the full line positions of FIG. 5.

Energization of the motor M2 upon closure of switch 502m will now cause pump P2 to pump fluid from reservoir 212 into the cylinder 210 beneath pilot valve stem actuator piston 209, thus moving the pilot valve stem 200 off of its seat 42. As previously mentioned, the pilot valve stem 100 is at this time reseated. Therefore, high pressure or line pressure which has heretofore been trapped in the main valve chamber will pass through port 40 in fitting 38 and thence into the chamber 45a in the pilot valve stem support 45. From the chamber 45a, fluid will be exhausted from the main valve chamber through a bleeder port 33a in the reset pilot valve support fitting 33, thus venting the main valve chamber. With the main valve chamber above the main valve piston 29 now open to atmosphere, fluid pressure within the line acting on the minor area of the main valve MV will now shift the latter upwardly to the position shown in FIG. 2.

Inasmuch as switch 307 is normally closed and switch 502m is conjointly normally open, these switches are such that they must be manually or otherwise maintained in the broken line position of FIG. 5 so as to hold switch 502m in a position to enable energization of motor M2 of pilot valve means PV2, but when limit switch 501c breaks the circuit to motor M2, spring 210 will urge the pilot valve stem 200 back to its seat.

In order to serve as an indication of the position of the main valve MV, it is preferably provided with a position indicator rod designated 80 attached to the piston 29 and extending upwardly between fittings 38 and 48 in the bore 31 through the body 26, the latter being provided with an opening 81 and the rod projecting through a sealing gland 82 as shown in FIGS. 1 and 3 and being clearly visible adjacent the gauge G for the purpose of indicating the position of the main valve.

In order to facilitate service and repair of the valve assembly, it will be observed that the manual valve 72 may be closed so as to prevent the flow of fluid under line pressure into the passage 69 in the central block 11 so that the respective pilot valve assemblies PV1 and PV2 may be bodily removed for inspection and maintenance. In addition, the pressure gauge G is preferably mounted upon a fitting 85 having a manually controlled valve 86 for shutting off the flow of fluid to the pressure gauge whereby upon closure of the valve 86 the gauge G may be removed for maintenance. Such maintenance and repair of the pilot valve assemblies and the gauge does not interfere with the continued flow of line fluid through the valve.

While the specific details of the invention have been herein shown and described, it will be apparent that changes and alterations may be resorted to without departing from the spirit of the invention as defined in the claims. Moreover, it will be apparent that in accordance with the objectives stated at the commencement hereof, the present invention provides an easily maintained flow control valve having a pilot valve responsive to variations in flow pressure to cause closure of the main valve while a second pilot valve is effective to enable resetting of the main valve responsive to line pressure itself. Moreover, the operation of the first pilot valve, in addition to being pressure responsive, is under the control of a manually operable switch. This manually operable switch as well as the reset switch all embodied within the control box 300 may be located at some remote point, and it will be apparent that a plurality of control systems in accordance with the invention may be advantageously located at a central location adjacent a tank farm or the like, where the switches 305, 307 and 502m may be actuated pursuant to variations in the level of collection tank supplied with fluid from the discharge through the valve assembly.

I claim:

1. A fluid pressure operated shut-off valve comprising: a main valve housing; means for supporting said housing in a fluid flow line; said housing having therein a fluid passage for the flow of fluids therethrough and a main valve chamber; a main valve shiftably disposed in said chamber for movement into said fluid passage to close off the flow of well fluid therethrough; a passageway leading from said fluid passage to the main valve chamber at the opposite side of the main valve from said fluid passage; first single pilot valve means interposed in said passageway normally biased to close the same and responsive to predetermined increase or decrease in fluid pressure in the fluid passage aforesaid for opening said passageway to permit fluid from said flow passage to flow into the valve chamber and shift said main valve to a closed position; and second pilot valve means for venting said valve chamber when said first pilot valve means is closed whereby fluid pressure in said passage will shift said main valve to a position opening said fluid passage for the flow of well fluid therethrough.

2. A fluid pressure operated shut-off valve comprising: a main valve housing; means for supporting said housing in a fluid flow line; said housing having therein a fluid passage for the flow of fluids therethrough and a main valve piston reciprocable in said chamber and having a major end area exposed to fluid pressure in said chamber and a minor area exposed to fluid in said passage; means cooperative with said main valve piston for closing said fluid passage upon movement of said main valve piston in one direction responsive to the pressure of fluid in said main valve chamber; a passageway leading from said fluid passage upstream of said main valve piston to said chamber to expose the major end area of said main valve piston to the pressure of fluid in said fluid passage; first single pilot valve means including a shiftable pilot valve element disposed in said passageway and normally biased to close the same and shiftable to a position permitting the transfer of fluid pressure from said fluid passageway to said chamber; means for shifting said pilot valve element to said position comprising a fluid pressure operated actuator device and electric motor-pump means for supplying fluid under pressure to said actuator device; means for energizing the motor of said motor-pump means; and second pilot valve means for venting said chamber when said first pilot valve means is closed whereby fluid pressure in said fluid passage will shift said main valve piston to a position opening said passage for the flow of fluid therethrough.

3. A fluid pressure operated shut-off valve comprising: a main valve housing; means for supporting said housing in a fluid flow line; said housing having therein a fluid passage for the flow of fluids therethrough and a main valve piston reciprocable in said chamber and having a major end area exposed to fluid pressure in said chamber and a minor area exposed to fluid in said passage; means cooperative with said main valve piston for closing said fluid passage upon movement of said main valve piston in one direction responsive to the pressure of fluid in said main valve chamber; a passageway leading from said fluid passage upstream of said main valve piston to said chamber to expose the major end area of said main valve piston to the pressure of fluid in said fluid passage; first single pilot valve means including a shiftable pilot valve element disposed in said passageway and normally biased to close the same and shiftable to a position permitting the transfer of fluid pressure from said fluid passageway to said chamber; means for shifting said pilot valve element to said position comprising a fluid pressure operated actuator device and electric motor-pump means for supplying fluid under pressure to said actuator device; a fluid pressure responsive switch operatively connected to the motor of said electric motor-pump means to energize the same responsive to a predetermined increase or decrease in the pressure in said fluid passage; a passageway leading from said fluid passage to said fluid pressure actuated switch; and second pilot valve means for venting said chamber when said first pilot valve means is closed whereby fluid pressure in said fluid passage will shift said main valve piston to a position opening said fluid passage for the flow of fluid therethrough.

4. A fluid pressure operated shut-off valve comprising: a main valve housing; means for supporting said housing in a fluid flow line; said housing having therein a fluid passage for the flow of fluids therethrough and a main valve piston reciprocable in said chamber and having a major end area exposed to fluid pressure in said chamber and a minor area exposed to fluid in said passage; means cooperative with said main valve piston for closing said fluid passage upon movement of said main valve piston in one direction responsive to the pressure of fluid in said main valve chamber; a passageway leading from said fluid passage upstream of said main valve piston to said chamber to expose the major end area of said main valve piston to the pressure of fluid in said fluid passage; first single pilot valve means including a shiftable pilot valve element disposed in said passageway and normally biased to close the same and shiftable to a position permitting the transfer of fluid pressure from said fluid passageway to said chamber; means for shifting said pilot valve element to said position comprising a fluid pressure operated actuator device and electric motor-pump means for supplying fluid under pressure to said actuator device; a fluid pressure responsive switch operatively connected to the motor of said electric motor-pump means; a passageway leading from said fluid passage to said fluid pressure actuated switch; said switch having a pair of fixed contacts and a shiftable contact; means for shifting said shiftable contact into engagement with one of said fixed contacts responsive to a predetermined increase or decrease in the pressure of fluid in said fluid passage; and second pilot valve means for venting said chamber when said first pilot valve means is closed whereby fluid pressure in said fluid passage will shift said main valve piston to a position opening said fluid passage for the flow of fluid therethrough.

5. A fluid pressure operated shut-off valve comprising: a main valve housing; means for supporting said housing in a fluid flow line; said housing having therein a fluid passage for the flow of fluids therethrough and a main valve piston reciprocable in said chamber and having a major end area exposed to fluid pressure in said chamber and a minor area exposed to fluid in said passage; means cooperative with said main valve piston for closing said fluid passage upon movement of said main valve piston in one direction responsive to the pressure of fluid in said main valve chamber; a passageway leading from said fluid passage upstream of said main valve piston to said chamber to expose the major end area of said main valve piston to the pressure of fluid in said fluid passage; first single pilot valve means including a shiftable pilot valve element disposed in said passageway and normally biased to close the same and shiftable to a position permitting the transfer of fluid pressure from said fluid passageway to said chamber; means responsive to the pressure of fluid in said passageway for shifting said pilot valve element to said position permitting the transfer of fluid pressure upon a predetermined increase or decrease in the pressure of fluid in said passage; and second pilot valve means including a shiftable element for venting said chamber when said first pilot valve means is closed whereby fluid in said fluid passage will shift said main valve piston to a position opening said fluid passage.

6. A fluid pressure operated shut-off valve comprising: a main valve housing; means for supporting said housing in a fluid flow line; said housing having therein a fluid passage for the flow of fluids therethrough and a main valve piston reciprocable in said chamber and having a major end area exposed to fluid pressure in said chamber and a minor area exposed to fluid in said passage; means cooperative with said main valve piston for closing said fluid passage upon movement of said main valve piston in one direction responsive to the pressure of fluid in said main valve chamber; a passageway leading from said fluid passage upstream of said main valve piston to said chamber to expose the major end area of said main valve piston to the pressure of fluid in said fluid passage; first single pilot valve means including a shiftable pilot valve element disposed in said passageway and normally biased to close the same and shiftable to a position permitting the transfer of fluid pressure from said fluid passageway to said chamber; means for shifting said pilot valve element to said position permitting the transfer of fluid pressure responsive to predetermined increase or decrease in the pressure of fluid in said passage; second pilot valve means including a shiftable element for venting said chamber when said first pilot valve means is closed; said second pilot valve means including a fluid pressure operated actuator for said second pilot valve element; and electric motor-pump means for supplying fluid under pressure to said actuator.

7. A fluid pressure operated shut-off valve comprising: a main valve housing having a fluid passage therethrough; a main valve chamber in said housing; a differential end area main valve piston shiftable in said main valve chamber to a position with the small end of said piston closing off said fluid passage; a passageway leading from said fluid passage upstream of said main valve to said piston chamber to impose main valve actuating pressure on the large end of said piston; means for closing off said passageway including a first single pilot valve; means for shifting said pilot valve to an open position upon a predetermined reduction in pressure in said fluid passageway or upon a predetermined rise in pressure in said fluid passage; a second pilot valve; and means for opening said second pilot valve to vent fluid pressure from said chamber when said first pilot valve is closed whereby fluid pressure in said fluid passage will shift said main valve piston to a position opening said fluid passage for the flow of fluid therethrough.

8. A shut-off valve as defined in claim 7, wherein the means for shifting said first pilot valve includes an electric motor-pump; an actuator cylinder in communication with said pump; a piston shiftable in one direction upon energization of said motor-pump to supply fluid to said cylinder at one side of said actuator piston; and a pilot valve element connected to said piston and extending into said passageway.

9. A fluid pressure operated shut-off valve, comprising: a main valve housing; means for supporting said housing in a fluid flow line; said housing having therein a fluid passage for the flow of fluids therethrough and a main valve chamber; a main valve shiftably disposed in said chamber for movement into said fluid passage to close off the flow of well fluid therethrough; a passageway leading from said fluid passage to the main valve chamber at the opposite side of the main valve from said fluid passage; first single pilot valve means interposed in said passageway normally biased to close the same and responsive to a predetermined increase or decrease in fluid pressure in the fluid passage aforesaid for opening said passageway to permit fluid from said flow passage to flow into the valve chamber and shift said main valve to a closed position; means for opening said first pilot valve means comprising a fluid pressure operated actuator device and electric motor-pump means for supplying fluid under pressure to said actuator device; a switch in circuit with the motor of said electric motor-pump means for energizing said electric motor; and second pilot valve means for venting said valve chamber when said first pilot valve means is closed whereby fluid pressure in said passage will shift said main valve to a position opening said fluid passage for the flow of well fluid therethrough.

References Cited by the Examiner

UNITED STATES PATENTS

| | | | |
|---|---|---|---|
| 2,900,997 | 8/1959 | Bostock | 137—458 |
| 2,961,002 | 11/1960 | Gordon | 137—623 |
| 2,964,059 | 12/1960 | Geyer | 137—623 |
| 2,993,504 | 7/1961 | Sizer | 137—458 |
| 3,043,331 | 7/1962 | Peters | 137—458 |

ISADOR WEIL, *Primary Examiner.*

M. CARY NELSON, *Examiner.*

J. SIEGEL, D. ROWE, H. WEAKLEY,
*Assistant Examiners.*